United States Patent [19]

Shimamura et al.

[11] Patent Number: 5,240,095
[45] Date of Patent: Aug. 31, 1993

[54] HYDRAULIC FRICTIONAL DEVICE

[75] Inventors: Tsutomu Shimamura; Muneo Mizuta, both of Shizuoka, Japan

[73] Assignee: Jatco Corporation, Japan

[21] Appl. No.: 700,442

[22] Filed: May 15, 1991

[30] Foreign Application Priority Data

May 16, 1990 [JP] Japan .................................. 2-127939

[51] Int. Cl.$^5$ .............................................. F16D 13/72
[52] U.S. Cl. .............................. 192/70.12; 192/113 B
[58] Field of Search .............. 192/70.12, 113 B, 70.14

[56] References Cited

U.S. PATENT DOCUMENTS

| | | | |
|---|---|---|---|
| 1,702,116 | 2/1929 | Hoffman | 192/70.12 X |
| 2,518,016 | 8/1950 | Johnson et al. | 188/71 |
| 2,976,995 | 3/1961 | Thostenson et al. | 192/70.12 |
| 4,085,835 | 4/1978 | Bailey | 192/113 |
| 4,113,067 | 9/1978 | Coons et al. | 192/70.12 X |
| 4,856,635 | 8/1989 | Vlamakis | 192/70.12 |
| 4,958,712 | 9/1990 | Suganuma et al. | 192/70.12 |

FOREIGN PATENT DOCUMENTS

| | | | |
|---|---|---|---|
| 1216624 | 5/1966 | Fed. Rep. of Germany . | |
| 51-144859 | 12/1976 | Japan . | |
| 59-54825 | 3/1984 | Japan | 192/70.12 |
| 61-175322 | 8/1986 | Japan | 192/113 B |
| 0734460 | 5/1980 | U.S.S.R. | 192/70.12 |

OTHER PUBLICATIONS

Patents Abstracts of Japan M-548 Dec. 24, 1986 vol. 10/No. 385.
"Nissan Full Range Electronically Controlled Automatic Transmission of the RE4R01A Type" Service Manual, published in Japan, Mar. 1987.

Primary Examiner—Leslie A. Braun
Assistant Examiner—Andrea Pitts
Attorney, Agent, or Firm—Ronald P. Kananen

[57] ABSTRACT

A hydraulic frictional device disclosed herein is a multiple plate clutch or brake. The device includes a set of interleaved friction plates including a plurality of driving plates and a plurality of driven plates. In order for increased dissipation of heat from the friction plates, some of the interleaved friction plates has radially extending through passages for a hydraulic fluid to pass therethrough.

1 Claim, 6 Drawing Sheets

FIG. 6A FIG. 6B
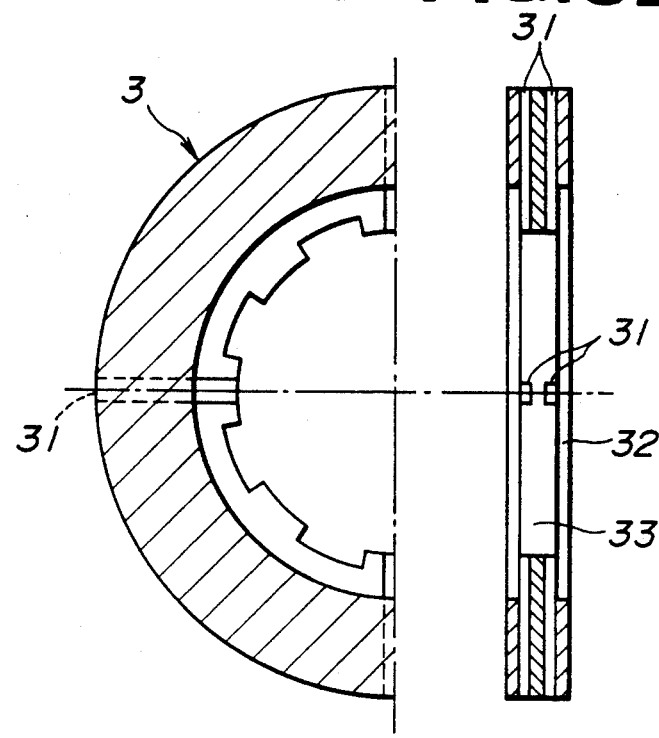
FIG. 7A FIG. 7B
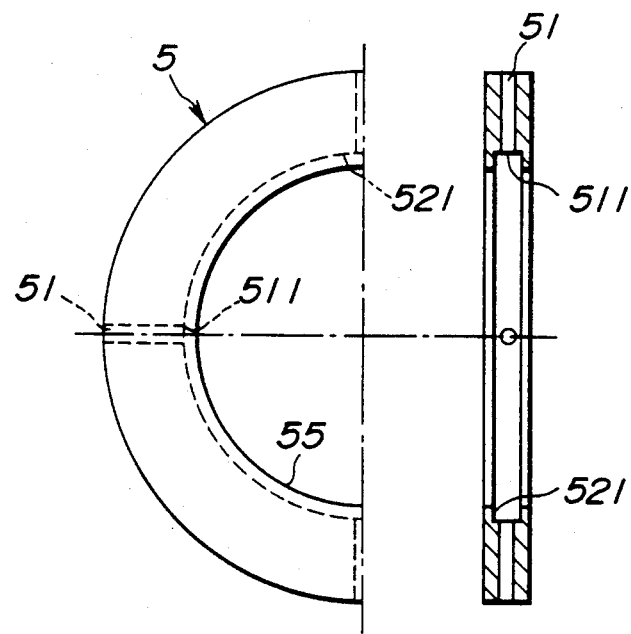

5,240,095

HYDRAULIC FRICTIONAL DEVICE

BACKGROUND OF THE INVENTION

The present invention relates to a hydraulic frictional device or element which is used in a power train of an automatic transmission in the form of a multiple plate clutch or a multiple plate brake.

A service manual entitled "NISSAN FULL RANGE ELECTRONICALLY CONTROLLED AUTOMATIC TRANSMISSION OF THE RE4R-01A TYPE" published in Japan in March 1987 shows on pages I-79 to I-83 a plurality of such hydraulic frictional devices of the above kind. The hydraulic frictional devices use a hydraulic working fluid for cooling a set of interleaved friction plates. In order to effectively cool the friction plates, an arrangement is made to splash the hydraulic fluid onto the plates or immerse the plates in the hydraulic fluid.

Heat is generated and accumulated in each of the friction plates owing to frequent repetition of engagement and release cycle or sliding engagement over a prolonged period of time. The amount of heat accumulated to one of the plates is determined by its heat capacity. If this heat capacity is low, therefore, the plates are liable to be baked.

An object of the present invention is to improve a hydraulic frictional device of the above kind such that heat accumulated in one of the friction plates is effectively dissipated without any major modification of the hydraulic frictional device.

SUMMARY OF THE INVENTION

According to the present invention, there is provided a hydraulic frictional device, comprising:
 a set of interleaved friction plates including a plurality of driving plates and a plurality of driven plates;
 a driver member rotatable with said driving plates; and
 a driven member rotatable with said driven plates,
 wherein at least one of said set of interleaved friction plates has at least one through passage for a hydraulic fluid to pass therethrough.

BRIEF DESCRIPTION OF THE DRAWINGS

FIGS. 6A and 6B are similar views to FIGS. 4A and 4B, respectively, but showing a modification of the driving plate;

FIGS. 7A and 7B are similar views to FIGS. 3A and 3B, respectively, but showing a modification of the retaining plate;

DETAILED DESCRIPTION OF THE INVENTION

Figure 1:
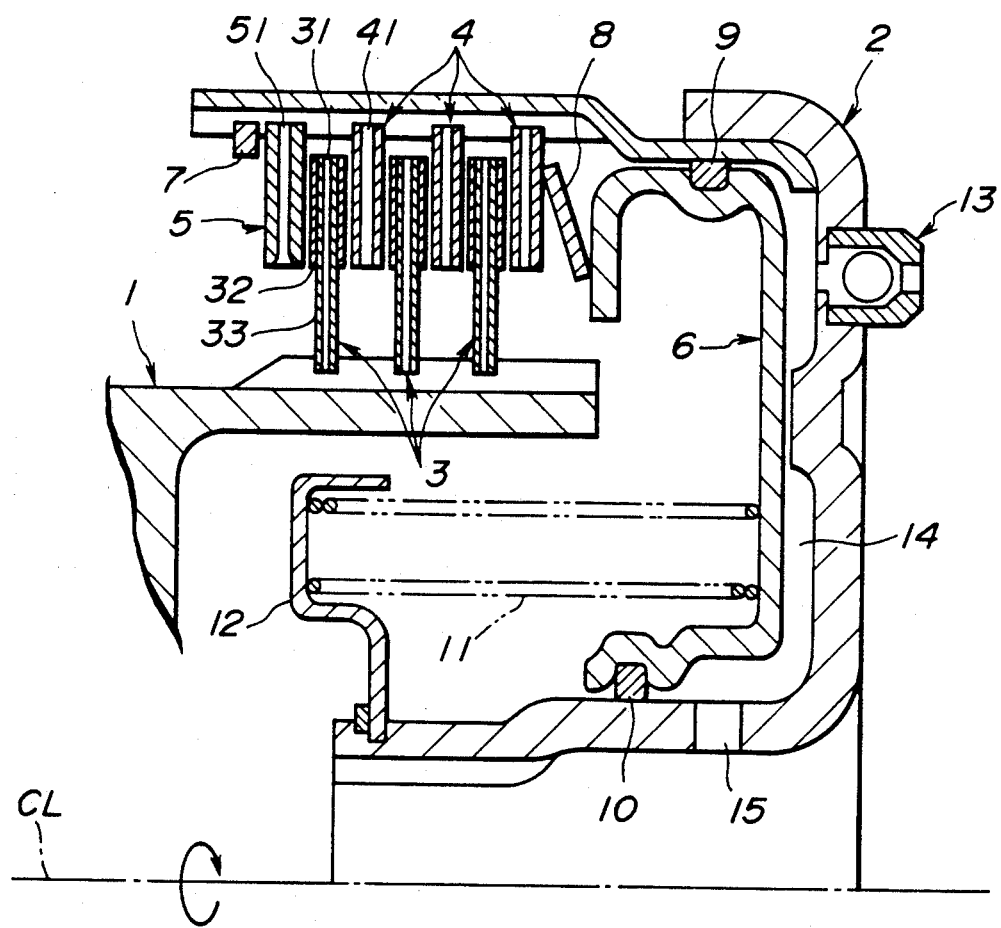
FIG. 1 is a fragmentary sectional view of a first embodiment of a hydraulic frictional device, in the form of a multiple plate clutch, according to the present invention.

Referring to FIG. 1, a hydraulic frictional device is in the form of a multiple plate clutch and comprises a driver member in the form of a clutch drum 1, a driven member in the form of a clutch hub 2, and a set of interleaved friction or clutch plates. The set of interleaved friction plates includes a plurality of driving plates 3 splined to the clutch drum 1, a plurality of driven plates 4 splined to the clutch hub 2, and a retaining plate 5 splined to the clutch hub 2.

The driving plates 3, driven plates 4 and retaining plate 5 are urged into firm engagement by a hydraulically operated piston 6. The multiple plate clutch also comprises a snap ring 7, a dish plate 8, piston seals 9 and 10, a spring retainer 12, a ball valve 13, a piston servo chamber 14, and a clutch hole 15.

Figure 2:
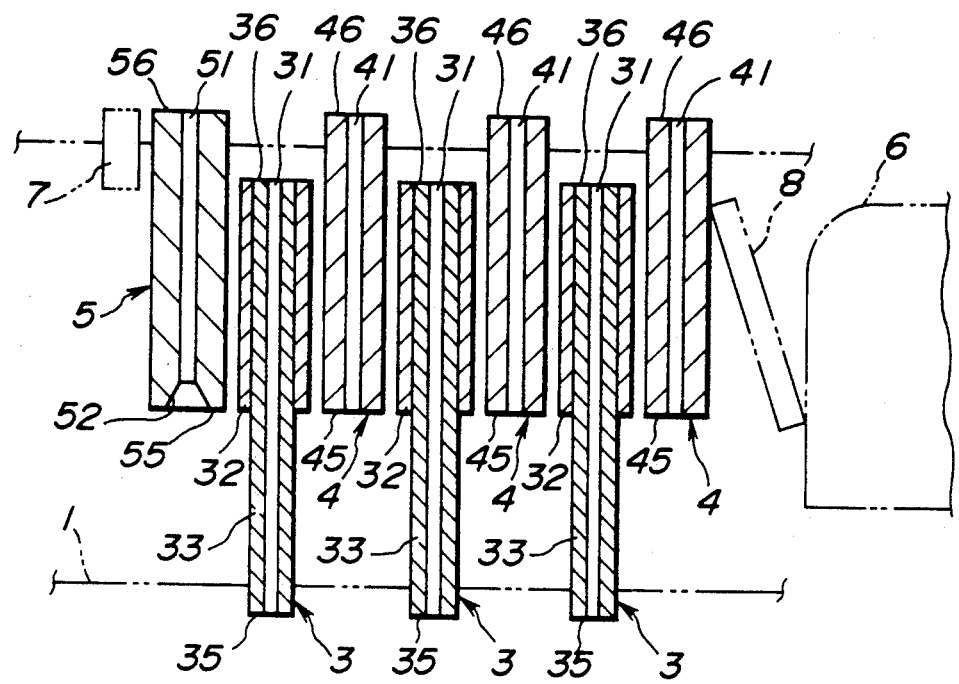
FIG. 2 is an enlarged view of FIG. 1 showing a set of interleaved friction plates including a plurality of driving plates, a plurality of driven plates, and a retaining plate.
Figures 3A, 3B:
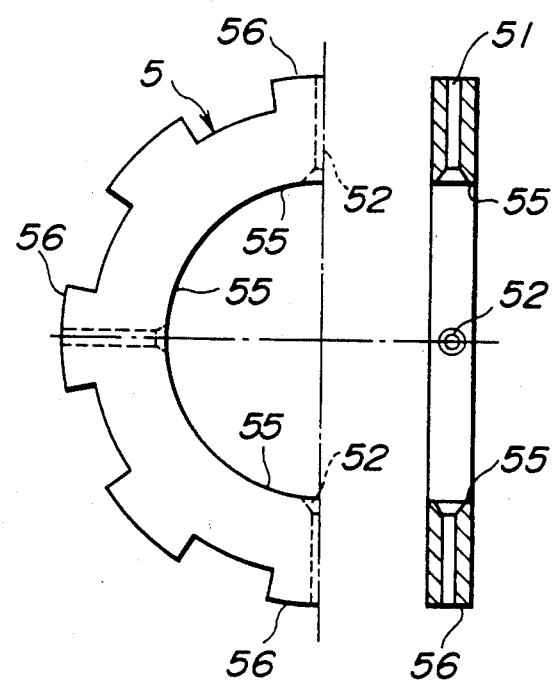
FIG. 3A is a fragmentary plan view of the retaining plate used in the first embodiment.
FIG. 3B is a diametrically radial cross section of FIG. 3A.

Referring to FIGS. 2, 3A, and 3B, the retaining plate 5 is formed with four through passages 51, each being a stragight radially extending bore or passage having an inlet and opening at an inner periphery 55 of the retaining plate 5 and an outlet end opening at an outer periphery 56 thereof. The inner end of each of the through passages 51 is enlarged at 52 by chamfering for increased inflow of a hydraulic fluid.

Figures 4A, 4B:
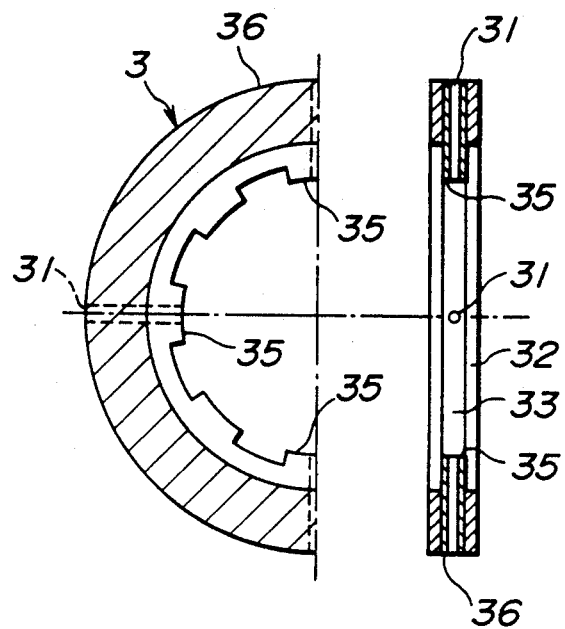
FIG. 4A is a fragmentary plan view of each of the plurality of driving plates used in the first embodiment.
FIG. 4B is a diametrically radial cross section of FIG. 4A.

Referring to FIGS. 2, 4A, and 4B, each of the driving plates 3 includes a core 33 with two friction pads 32, and is formed with four through passages 31, each being a straight radially extending bore or passage formed through the core 33. Each of the through passages 31 has an inlet end opening at an inner periphery 35 of the core 33 and an outlet end opening at an outer periphery 36 thereof.

Figures 5A, 5B:
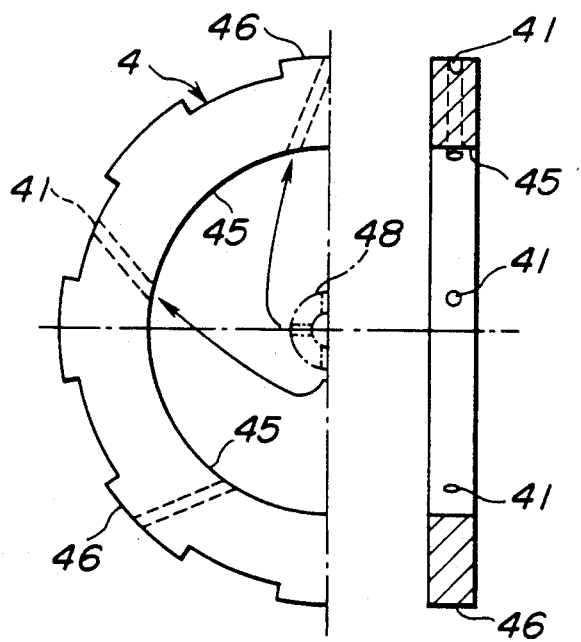
FIG. 5A is a fragmentary plan view of each of the plurality of driven plates used in the first embodiment.
FIG. 5B is a diametrically radial cross section of FIG. 5A.

Referring to FIGS. 2, 5A, and 5B, each of the driven plates 4 is formed with four through passages 41, each being a straight bore or passage inclined in a direction of rotation of the driven plate 4. Each of the inclined through passages 41 has an inlet end opening at an inner periphery 45 of the driven plate 4 and an outlet end opening at an outer periphery 46 thereof. The degree of inclination of each of the through passages 41 is chosen such that the directions of the through passages 41 generally agree with directions in which the hydraulic fluid is thrown radially outwardly from a hydraulic fluid supply shaft 48 (see FIG. 5A) upon transmission of the maximum torque. The hydraulic fluid passing through these inclined through passages 41 is subject to a small flow resistance as compared to the straight radially extending through passages 31 and 51.

In operation, the hydraulic fluid thrown radially outwardly enters each of the above-mentioned through passages 51, 31 and 41 and flows from their inner ends to the outer ends, respectively. Owing to the flows of hydraulic fluid through each of the plates 5, 3 and 4, heat accumulation in each of these plates is suppressed.

For increased cooling efficiency, as shown in FIGS. 6A and 6B, straight radially extending through passages 31 extend between a core 33 and friction pads 32. This arrangement is effective in suppressing heat generated at each of the friction pads 32. For an increased rate of inflow of hydraulic fluid, as shown in FIGS. 7A and 7B, a retaining plate 5 is formed with a circumferential groove 521 with a bottom wall at which each of through passages 51 has an inlet end 511. This groove 521 serves as a hydraulic fluid catch groove to ensure that enough hydraulic fluid is supplied to the inlet ends 511. Such a catch groove may be formed in each of driven plates 4 if desired.

Figure 8:
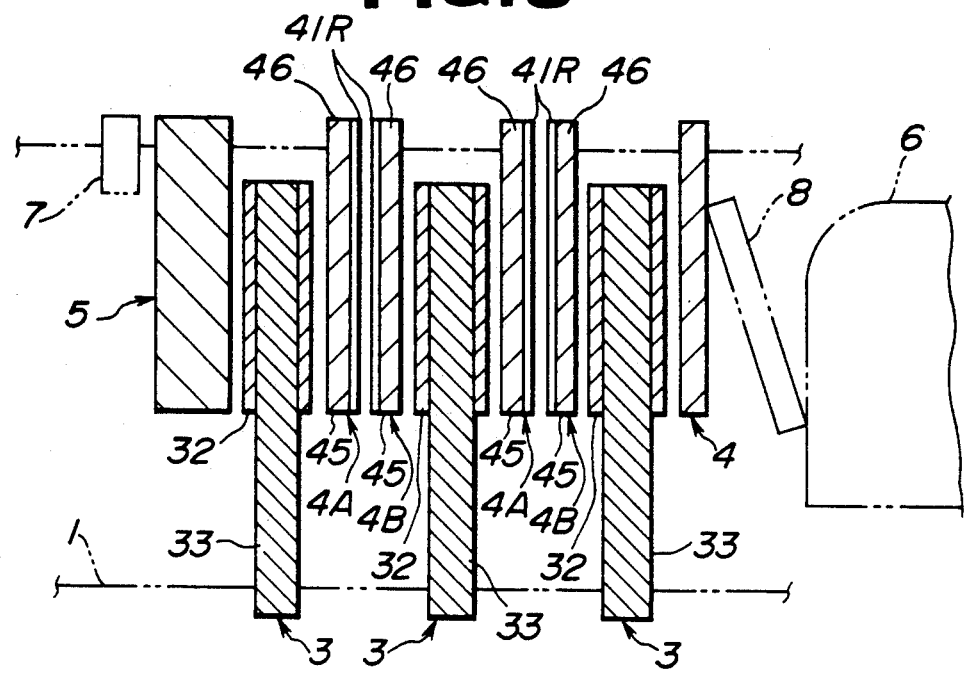
FIG. 8 is a similar view to FIG. 2 showing a second embodiment.
Figures 9A, 9B:
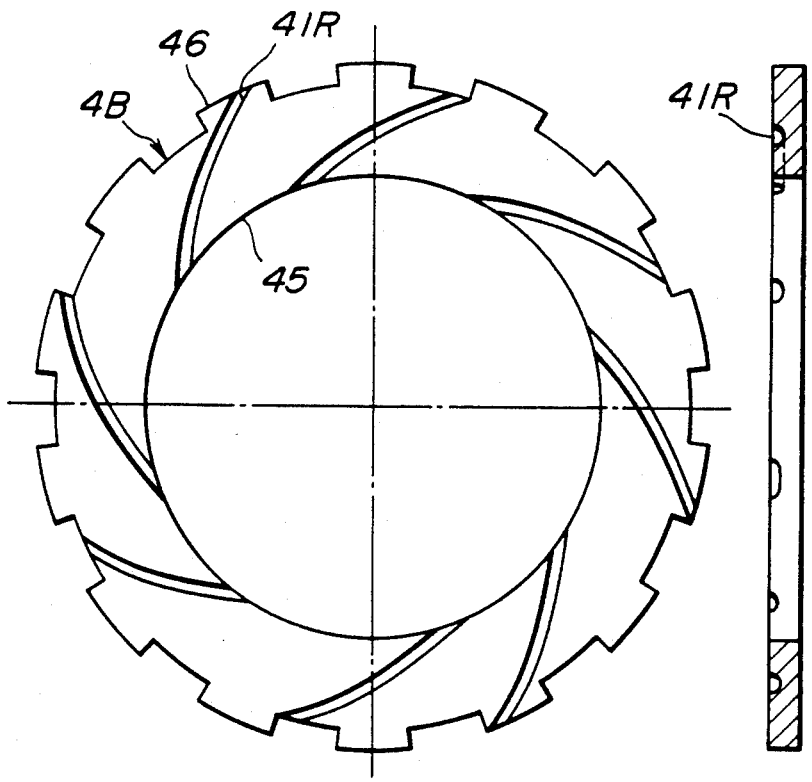
FIG. 9A is a plan view of each of driven the plates used in the second embodiment.
FIG. 9B is a diametrically radial cross section of FIG. 9A.

Referring to FIGS. 8, 9A and 9B, the second embodiment is described. As shown in FIG. 8, a driven plate 4A and a driven plate 4B form a single pair. The two driven plates 4A and 4B of each pair have mutually facing ends, each being formed with eight spiral passages 41R as best seen in FIG. 9A. Upon engagement, the mutually facing ends of the driven plates 4A and 4B come into firm engagement with the sprial passages of the driven plate 4A in agreement with the mating ones of the driven plate 4B. As best seen in FIG. 9A, each of the spiral passages 41R has an inlet end opening at an inner periphery 45 of the driven plate 4B and an outlet end at an outer periphery 46 thereof. Owing to this curvature, a hydraulic fluid passing through the passages 41R is subject to the minimum flow resistance as compared to the other previously described embodiments.

Figure 10:
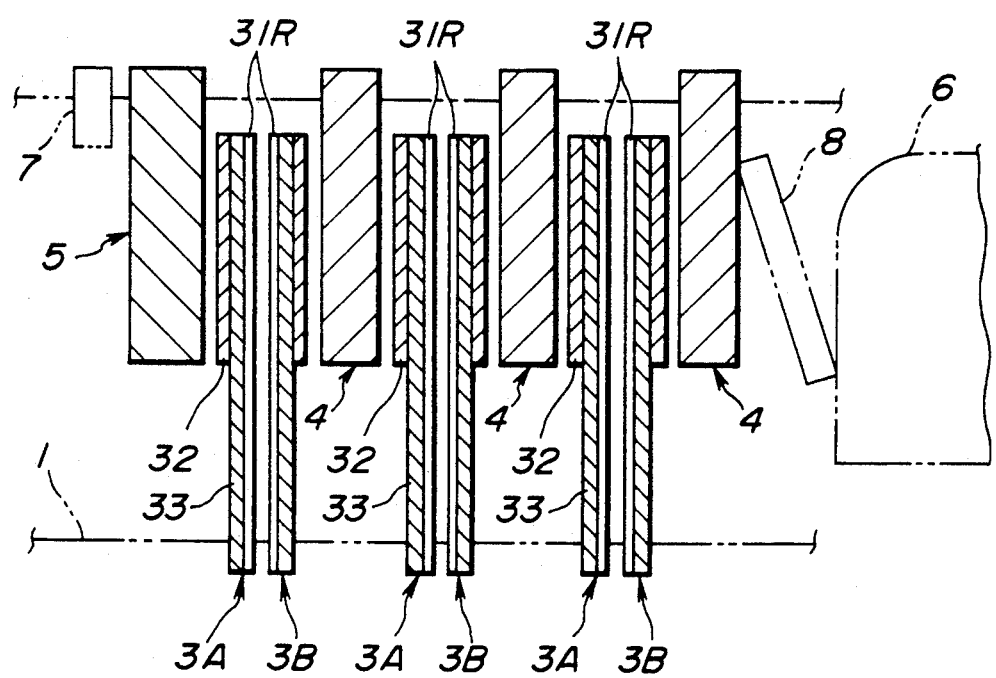
FIG. 10 is a similar view to FIG. 8 showing a third embodiment.

The passage arrangement described in connection with FIGS. 8, 9A and 9B is applied to driving plates as shown in FIG. 10. In FIG. 10, a driving plate 3A and a mating driving plate 3B of a pair have mutually facing ends formed with spiral passages 31R, each having an inlet end opening at an inner periphery of the driving plate and an outlet end opening at an outer periphery thereof.

The degree of inclination and curvature of each of such spiral passages are designed to trace flows of hydraulic fluid radially thrown outwardly upon transmission of the maximum torque. Thus, the maximum cooling efficiency is produced upon transmission of the maximum torque through the hydraulic frictional device.

Although in the previously described embodiments, the invention has been applied to the multiple plate clutch, the invention is applicable to a multiple plate brake.

What is claimed is:

1. A hydraulic frictional device, comprising:
   a set of interleaved friction plates including a plurality of driving plates, a plurality of driven plates and a retaining plate;
   a driver member rotatable with said plurality of driving plates;
   a driven member rotatable with said plurality of driven plates;
   at least one of said set of interleaved friction plates having a radially outer periphery, a radially inner periphery formed with a circumferential catch groove and a plurality of through passages, each having one end opening at said catch groove and an opposite end opening at said radially outer periphery for allowing a hydraulic fluid to pass therethrough.

* * * * *